April 18, 1961     R. RABIN     2,980,900
SYNCHRO ENCODER

Filed Aug. 21, 1957     3 Sheets-Sheet 2

RELATIONSHIP BETWEEN PHASE VOLTAGES
AND SCANNING VOLTAGES

INVENTOR
RICHARD RABIN

BY
ATTORNEY

April 18, 1961 R. RABIN 2,980,900
SYNCHRO ENCODER
Filed Aug. 21, 1957 3 Sheets-Sheet 3

INVENTOR
RICHARD RABIN
BY Victor D. Borst
ATTORNEY

United States Patent Office 2,980,900
Patented Apr. 18, 1961

2,980,900

SYNCHRO ENCODER

Richard Rabin, Stamford, Conn., assignor to Sperry Rand Corporation, Ford Instrument Company Division, Long Island City, N.Y., a corporation of Delaware Filed Aug. 21, 1957, Ser. No. 679,427

5 Claims. (Cl. 340—347)

This invention relates to encoders and particularly to dual speed synchro-driven indicating systems for converting analog values to digital values and reading the latter.

Generally, the invention contemplates an encoder which serves to convert analog information from a dual-speed synchro transmitter system into digital form available for readout in a digital computer. According to the invention an oscillator is provided to start a clock-driven pulse counter which is stopped on zero voltage output of a zero comparator circuit. The zero comparator circuit is arranged to yield zero voltage when the voltage of the synchro transmitters in the analog computer and the output of the oscillating circuit in the converter are the same. Therefore, the number of pulses counted in digital fashion by the counter between the time the counter is started and the time the shaft positions of the synchro transmitters are matched with the oscillator output is proportional to the amount of rotation of the shafts. Shaft rotation being an analog function, the conversion to digital values is thus accomplished.

Specifically, the system provides for analog-digital conversion using two-speed fine and coarse synchro transmitters which are frequently employed in computing systems. Analog information is contained in the phase voltages of two remote synchro-transmitters which are referenced by a 60 cycle synchro-reference line. Each phase-voltage waveform is a 60 cycle suppressed-carrier modulated signal, characteristic of synchro devices. The system provides a demodulator connected to each transmitter and yielding modulation envelope voltages containing the analog or positional information. These voltages are fed to voltage comparators where they are scanned by a high frequency sampling voltage provided by an oscillator. Pulse clocks are connected to the zero comparator and the voltage comparator circuits, being started by the former at zero phase angle and stopped by the latter when the modulation envelope and sampling voltages agree. The clocks are stopped by the voltage comparator circuits in such a manner that the number of coarse pulses generated is proportional to the shaft rotation on the coarse synchro. Similarly, the number of fine pulses generated is proportional to the shaft position of the fine synchro. The coarse and fine pulses are counted separately by coarse and fine counters. When a sampling has been completed, both counts are read out into a register in an unambiguous manner. The register therefore contains the required digital encoded output. The encoded number is revised every sampling time interval.

It is therefore an object of the invention to provide an improved analog to digital converter which employs a zero voltage comparator to operate a digital pulse counter and additionally provides analog and time components to control said comparator.

Other objects, advantages and features of the invention may be appreciated on reading the following detailed description of one embodiment thereof in conjunction with the accompanying drawings, in which Fig. 1 shows schematically the arrangement of conventional components used in the analog-digital information converting system;

Figure 1:
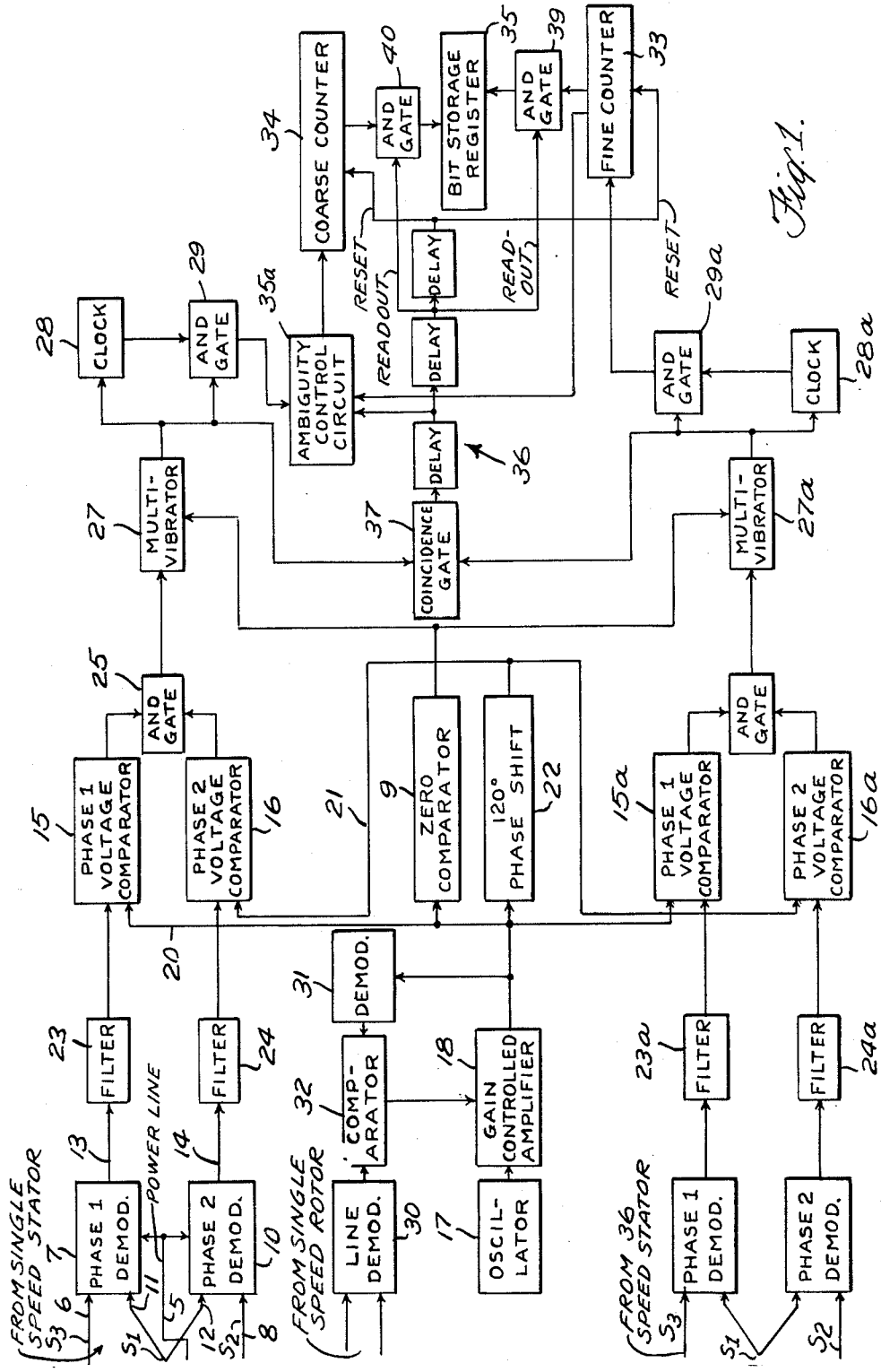

In the more detailed description below the encoder system is divided into three parts. Part I is the coarse data converter channel, Part II is the timing and control system and Part III is the fine data converter channel. Parts I and III consist of the same functional components and, hence, a description of one will suffice for both. The components of Part III are assigned the same reference numerals as the corresponding elements of Part I with the addition of the subscript $a$.

*Part I. Coarse data converter channel*

This portion of the system takes the single speed, synchro stator voltages and performs the digitizing of rotor angle in ten degree increments. The modulated voltage of one synchro phase winding, $\phi$ (not shown) on line 6 is fed to phase 1 demodulator 7 which phase demodulates the modulated voltage yielding a varying D.C. voltage proportional to the sine of the angle of rotation of the synchro. Phase demodulators suitable for the purposes of this invention are shown and described in the MIT Radiation Laboratory Series, volume 19, chapter 14, published by McGraw-Hill (1949). There are, however, two shaft angles for each D.C. voltage that the demodulator develops with the exception of 90° and 270°. Therefore, use is made of a second synchro phase voltage to eliminate ambiguity. Accordingly, a second synchro voltage phase $\phi_2$ is placed by another phase winding of the remote synchro and placed on line 8 and demodulated in demodulator 10. The demodulators 7 and 10 are referenced by a power line 5. Leads 13 and 14 feed the output of the demodulators to phase 1 and phase 2 voltage comparator circuits 15 and 16, respectively. Voltage comparator circuits of the type required by this system are shown in detail in Pulse and Digital Circuits, Millman and Taut, published by McGraw-Hill (1956), chapter 15, pages 458 and 459.

A scanning voltage developed in Part II by oscillator 17 and amplified by amplifier 18 is placed on line 20 which connects the amplifier to the comparator circuit 15. The line 20 is connected to zero comparator 9 and to line 21 through a phase shifter 22. The comparator circuit 16 is connected to the phase shifter 22 by the line 21. Zero comparators of the type which may be employed in this system may be found in Pulse and Digital Circuits, Millman and Taut, published by McGraw-Hill (1956), chapter 15, pages 477–480.

The output of each demodulator is compared with the sampling sine wave whose maximum amplitude is the same as the maximum possible amplitude of the demodulator output (i.e., the synchro modulation envelope). At two times during the sampling wave it will cross or equal the demodulator output voltage. This can be sensed by difference-amplifier circuitry of the voltage comparator circuits whose output is a measure of the instantaneous relative amplitudes of the two signals applied to the circuit. Specifically, when the two inputs are equal, the circuit will be balanced and the resultant output will be zero. This causes a blocking oscillator (not shown), which is part of the voltage comparator, to fire, producing a pulse at the instant of coincidence. This occurs twice during one cycle of the sampling sine wave. Only one of the times is the correct time. The correct time is found by taking the output of the second ($\phi_2$) demodulator and comparing it to the sampling sine wave of $\phi_1$. The sampling sine wave for $\phi_2$ must be phase shifted 120 degrees with respect to that of φ1 before using it in the voltage comparator 16. This takes into account the 120 degrees space phasing of the synchro windings. For φ2 there will also be two times of coincidence of D.C. voltage and sine wave voltage. However, one of the times of coincidence of φ2 D.C. voltage and sampling voltage will be the same time as one of the coincidences of the φ1 D.C. voltage with its sampling voltage. See Figure 2. This double coincidence is used to enable a gate which starts the operation of control functions in the overall system. In particular, clock gates are closed and clocks are stopped from oscillating as will be discussed later.

The amplitude of each synchro phase voltage is given by the following expressions:

$$E_{\phi 1}=E_{(S13)}=90 \sin a$$
$$E_{\phi 2}=E_{(S21)}=90 \sin (a+240°)$$
$$E_{\phi 3}=E_{(S32)}=90 \sin (a+120°)$$

and:

$$E_{\phi 1}=E_{\text{Rotor}}=115$$

where:

$a$ = Rotor Angular Position

For illustration, assume the rotor stationary at 45°, then:

$$E_{\phi 1}=90 \sin 45°=63.6 \text{ volts}$$
$$E_{\phi 2}=90 \sin 285°=-86.9 \text{ volts}$$

Figure 2:
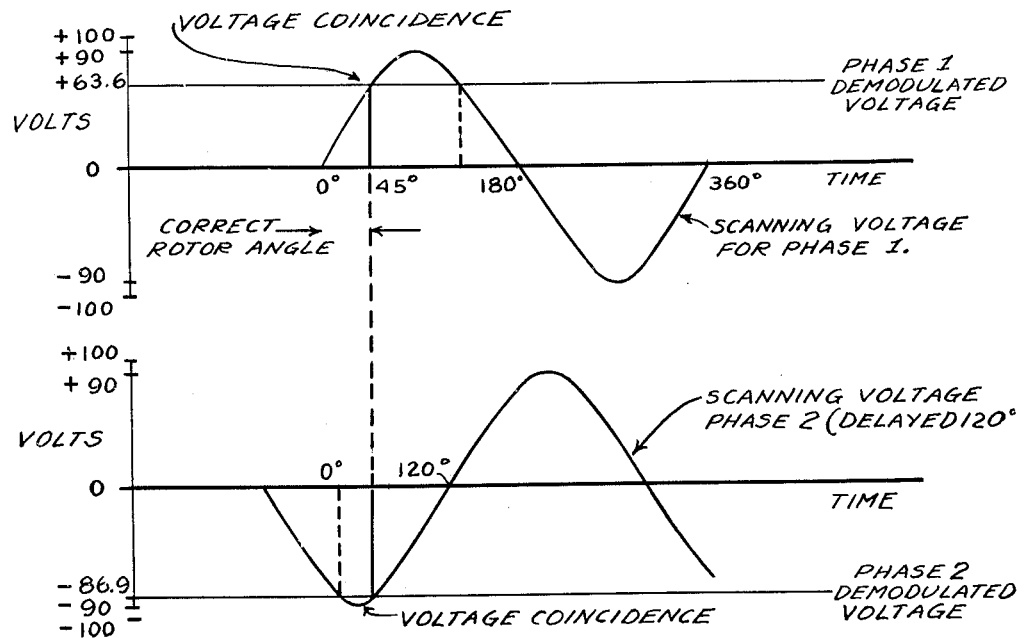
Fig. 2 are voltage diagrams showing the phase relationships of the synchro and sampling voltages.

The sampling sinusoid has an amplitude of 90 volts. The demodulated phase voltages and the sampling sinusoid voltages for this example are shown in Figure 2. All of the comparison points are also shown illustrating the selection of the proper comparison point.

The demodulator output may be filtered to smooth in the gaps in the modulation envelope which represents only peak values of the carrier frequency. When the synchro-transmitter rotor is stationary or is moving at slow speed the modulation envelope can be produced closely and accurately. At higher rotational speeds accurate demodulation will depend on the filtering used. Accordingly, filters 23 and 24 are provided in the comparator channels 13 and 14, respectively.

An and gate 25 is connected to the voltage comparators which are adapted to yield zero output at voltage coincidence. The coincidence pulses supply an output from the and gate, in the form of a pulse. The pulse is delivered to bi-stable multivibrator 27 which is caused to flip to the "close gate" or "stop clock" condition. Clock 28 and gate 29 are thus controlled by the comparators 15 and 16. The multivibrator is connected to the zero comparator 9 which sets the multivibrator in "open gate" or "start clock" condition each time the oscillator sine wave is at zero phase angle.

Part II

This portion of the system controls timing and data handling for Parts I and III and contains the digital output information. The timing controls that have to be introduced into Parts I and III are the zero-time pulse, which serves to start the digital clock measurements, and the sampling sine wave which, together with the demodulated synchro wave, provides the coincidence pulse to stop the clock measurements.

In the discussion of Part I it was pointed out that the peak amplitude of the sampling wave to the comparators must be equal to the maximum amplitude output (i.e., at 90°) from the demodulators. This would be easy to obtain and set if the maximum voltage from the demodulators was constant. However, this is not the case. The peak demodulator output may vary due to the fact that synchro power may be drawn from power installations whose specifications on voltage variation may be as much as ±10%. This means that peak demodulator outputs could vary ±10%. A fixed amplitude of sampling wave to the comparator would cause an erroneous output count to appear in the register with synchro power line variations. Actually it could cause a zero count to appear continuously in the register because there would be no time coincidences achieved for two of the four coincidences and the gates to the counters will remain open for the full count of 360° or 0°.

Amplitude control of the output of the amplifier 18 is obtained by continuously comparing in comparator 32 its peak output, which is demodulated by demodulator 31, with the peak output possible for line driven demodulator 30 and deriving an error signal from this comparison. The error signal is then fed back to the amplifier gain control system which changes the amplifier gain so that amplifier output comes into correspondence with the peak demodulator output. From the amplifier 18, two signals go to the comparators. One is the signal at zero phase angle and the other is the sine wave signal phase shifted by 120°. The reason for this phase shifting was explained in Part I.

Final output storage and data handling are also functions of Part II. It receives and stores the outputs from Parts I and III, in two counters 33 and 34, the former for the fine count and the latter for the coarse count. After both the coarse and the fine counts have been completed during a sampling interval, the two counters are read out into a storage register 35 to await further readout into the digital computer. Pulse counters of this type are described in Pulse and Digital Circuits, Millman and Taut, published by McGraw-Hill (1956), chapter 11, and storage registers are described in the same publication, chapter 13, pages 411 to 413.

The fourteen bit output storage register is divided into two counters of six bits and eight bits each. The six bit counter is the Coarse Counter and the eight bit counter is the Fine Counter. One count on the Coarse Couter represents 10° and one count of the Fine Counter represents $$\frac{10}{256}$$

degrees of Coarse synchro shaft position. Each count in the Coarse Counter corresponds to 10°. Each Fine count has a value corresponding to $$\frac{10°}{28}$$

or 2.34 minutes of arc. The accuracy of the total count is determined by the Fine count accuracy. During the sampling time, pulses are entered separately in each individual counter. When a comparison is made in the voltage comparator units, a gate voltage is generated and the pulse clock is stopped. Either the coarse or the fine gate voltage may appear first. When both have appeared, both counts have stopped indicating that the sampling is completed. A coincidence gate 37 detects the appearance of both gates. The output of the coincidence gate 37 activates the ambiguity read-out gates 39 and 40. The information is entered into the register from the two counters. After the counters have been read out, they are set to zero by a delayed output from the delay line 36 which is connected to the coincidence gate 37.

In any multi-speed system, where the individual speed signals are separately measured and the results then added, there always exists the possibility of error due to the impossibility of obtaining completely perfect alignment between the individual speed systems. This must always be overcome by special devices which, in effect, refer the coarse measurements to the fine measurement. Such a technique is incorporated in the proposed converter in the form of an ambiguity control circuit. Without this circuit, two different types of errors may occur. The first type of error results in the coarse counter being deficient by a single pulse due to slight inaccuracies of the coarse counter. This occurs when the fine synchro transmitter is in a position yielding a low fine count (i.e., the fine synchro shaft is near, but greater than, 0°), and the coarse counter does not count the required pulse. The second type results in an extra count in the coarse counter. This happens when the fine synchro transmitter is in a position which yields a high fine count (i.e., the fine synchro shaft position is near, but less than 360°). Slight inaccuracies in the coarse comparison contributes an extra pulse.

The coarse and the fine counting systems contain separate counters 33 and 34. An ambiguity control circuit 35a is incorporated to adjust the coarse counter to its proper value by referring to the information in the fine counter. The accuracy is then independent of the coarse counting system which does not have to be precise. The accuracy is thus determined primarily by the fine system.

Figure 3:
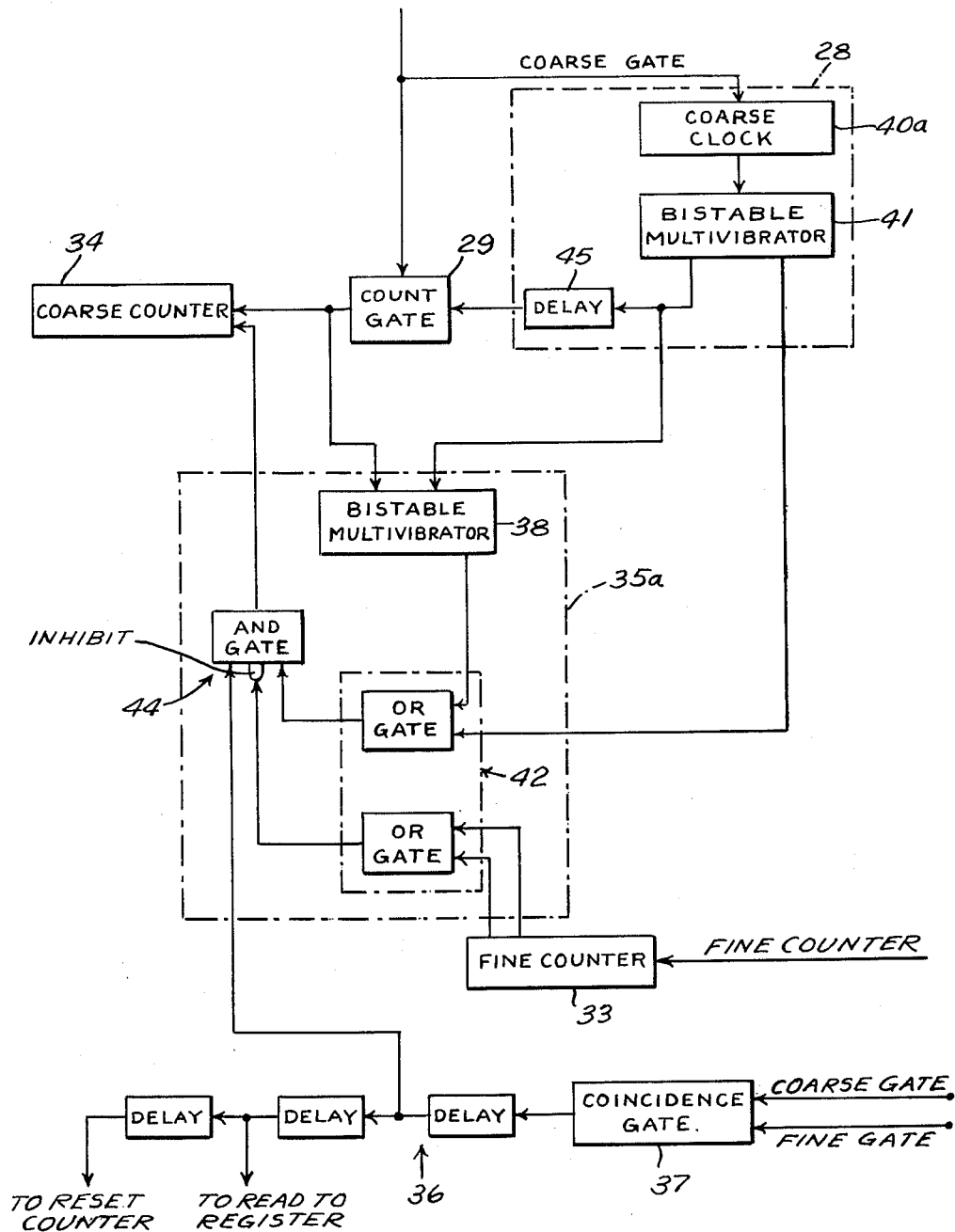
Fig. 3 is a block diagram of the ambiguity control circuit.

The method to eliminate the first type of error is now discussed. Reference to Figure 3 will aid in the explanation. A coarse clock 40a with a frequency $2f_c$, double that used for the counter, is required. This coarse clock is fed to a bi-stable multivibrator 41 and the output of the multivibrator at the proper frequency, $f_c$, is fed to the coarse counter, as shown in Figure 3 through a delay circuit 45 and the counting gate 29. An output from the bi-stable multivibrator is available which indicates when the coarse count is in the region half-way before a coarse count is presented to the counter. Shortly before the time to read out into the register occurs it is determined whether or not a count is to be added. If the fine counter is low (in the lower quarter, i.e., <2.5°), an additional count is added through gate 44 from multivibrator 41. If the fine count is >2.5°, the count is not added.

The circuitry used to eliminate the second type of wave is as follows:

A coarse count is not entered into the coarse counter 34 until it is certain that this count should be entered. The count from coarse clock 40a and bi-stable multivibrator 41 is delayed by the delay line 45. For a time corresponding to a shaft angle of 280.0° the count would not be advanced. That is, the 28th count would not be counted until the time equivalent to an angle of about 281.5°. At such time, the coarse count is presumed to be valid, i.e., within the accuracy of the coarse system. The delay D required to do this is then $$D = T_s \frac{1.5}{360}$$

where $T_s$ is time of sampling interval. A non-delayed count sets a bi-stable multivibrator 38. If the delayed pulse is permitted to go into the counter, this same pulse unsets the bi-stable multivibrator. This would occur if the coarse angle is greater than 281.5° for the sample shown and the coarse count is valid. However, if the coarse angle were, say 280.5°, when coarse coincidence is obtained, the coarse gate signal would close the counting gate 29 and the 28th count would not be entered. However, the bi-stable multivibrator 38 would remain in the set position, thus retaining the information that a pulse had attempted to enter but was detained. The decision as to whether or not the pulse is to be entered is made when both counters have finished counting. If the fine count is near 10°, the count is not entered. If the fine count is near 0°, the count is entered. A low fine count is determined by examining the two most significant bits in the fine counter. If either of the two most significant bits (hence the logical OR circuit 42) is present, the counter is in the upper ¾ of the register. Similarly, if both are not present (zero output from the OR), the fine count is in the lower ¼ (less than 2.5°) of the register. An indication that the fine counter is not in the low portion will then inhibit or stop the detained pulse from being counted. This logic is mechanized in a logical coincidence and inhibit circuit 44.

In the method of counting described above, the register 35 is given the sampled count at the time when both the coarse and the fine comparisons have been finished (whichever finishes last). It is also possible to enter the sampled count at the ends of each sampling time. The preferable method to be implemented depends on the manner of readout. Parallel or serial readout can be used. In either case, readout should not be performed while a count is being entered in the register. The exact method of readout depends on the application.

*Part III. Fine data converter channel*

This portion of the overall system contains exactly the same functional components and operates in the same manner as Part I.

What is claimed is:

1. A synchro to digital converter having a voltage comparison and pulse counting section comprising three stator lines, one of said stator lines being adapted to convey one phase of a synchro stator output, the second stator line being adapted to convey a second phase of a synchro stator output and the third stator line being adapted to convey the third phase of a synchro stator output, a pair of demodulators, one of said demodulators being connected to said one stator line and said second stator line and the other of said demodulators being connected to said second stator line and said third stator line, a first voltage comparator connected to one of said demodulators, a second voltage comparator connected to the other demodulator, an oscillator circuit, said first comparator being connected to said oscillator circuit, a phase shifter connected to said oscillator circuit, the second voltage comparator being connected to the output of said phase shifter, an "and" gate connected to said voltage comparators and adapted to yield a pulse when voltage coincidence simultaneously occurs in said voltage comparators, a zero comparator connected to said oscillator, a two-state device connected to said "and" gate and to said zero comparator and adapted to be in one state when a pulse is received from said zero comparator and to be in its second state when a pulse is received from said "and" gate, a gated clock device controlled by said two-state device, a pulse counter responsive to said clock device and an indicator responsive to said pulse counter.

2. An encoder as claimed in claim 1 wherein means are provided for generating an error signal to be combined with said oscillator output for removing the effect of power line variation in said comparator circuits.

3. An encoder as claimed in claim 2 in which said indicator is a bit storage register which is connected to said pulse counter for adding the output thereof.

4. An encoder as claimed in claim 3 in which there is provided a second voltage comparison and pulse counting section identical to said first mentioned section and arranged to convert separately a second speed signal of the synchro to digital form and means for detecting and removing error due to lack of alignment between the separately measured speed signals of the synchro transmitters.

5. An encoder as claimed in claim 4 in which the pulse counter in said first section is a coarse counter and the pulse counter in said second section is a fine counter and said error detecting and removing means includes an ambiguity control circuit, the output of said ambiguity and control circuit being connected to the coarse counter and its input side being connected to the fine counter, whereby the coarse counter is adjusted to its correct value by the fine counter system, the accuracy of the latter determining the accuracy of said encoder.

References Cited in the file of this patent

UNITED STATES PATENTS

| | | |
|---|---|---|
| 2,568,724 | Earp et al. | Sept. 25, 1951 |
| 2,791,746 | Bowersox et al. | May 7, 1957 |